United States Patent [19]

Strässle

[11] Patent Number: 4,641,983
[45] Date of Patent: Feb. 10, 1987

[54] CLAMPING DEVICE FOR THE SEPARABLE CONNECTION OF TWO PROFILE SECTION PARTS

[75] Inventor: Marcel Strässle, Kirchberg, Switzerland

[73] Assignee: Syma Intercontinental AG, Kirchberg, Switzerland

[21] Appl. No.: 619,466

[22] PCT Filed: Oct. 28, 1983

[86] PCT No.: PCT/CH83/00120
§ 371 Date: Jun. 1, 1984
§ 102(e) Date: Jun. 1, 1984

[87] PCT Pub. No.: WO84/01801
PCT Pub. Date: May 10, 1984

[30] Foreign Application Priority Data

Nov. 1, 1982 [CH] Switzerland .................. 6346/82

[51] Int. Cl.[4] .................. F16B 7/08; F16B 9/00
[52] U.S. Cl. .................. 403/12; 403/187; 403/252; 403/255
[58] Field of Search .............. 403/255, 252, 348, 12, 403/187

[56] References Cited

U.S. PATENT DOCUMENTS 3,672,710 6/1972 Kroopp .................. 403/252

FOREIGN PATENT DOCUMENTS 2603228 1/1977 Fed. Rep. of Germany ...... 403/252
2015686 9/1979 United Kingdom .

Primary Examiner—Andrew V. Kundrat
Attorney, Agent, or Firm—Sughrue, Mion, Zinn, Macpeak & Seas

[57] ABSTRACT

In a clamping device which serves to connect two profile section parts, in particular a horizontal beam (2), to a vertical support (1), an axially movable, spring-loaded retaining pin (7) is located at the end of one profile section part (2). The T-shaped head (8) of the retaining pin (7) engages behind a longitudinal groove (16) of the other profile section part. By means of a screw (12), which is eccentrically supported and engages in a conical recess (10) of the retaining pin (7), the retaining pin is drawn axially inwards in order to fix the two profile section parts (1, 2) to one another. For the purpose of simple assembly and to prevent the retaining pin from jumping out if the screw is rotated in the wrong direction, the retaining pin (7) has a snap-in connection to the insertion core.

4 Claims, 2 Drawing Figures

CLAMPING DEVICE FOR THE SEPARABLE CONNECTION OF TWO PROFILE SECTION PARTS

FIELD OF THE INVENTION

The invention concerns a clamping device for the separable connection of two profile section parts in accordance with the preamble to claim 1.

BACKGROUND OF THE INVENTION

A clamping device of this type is known, for example, from the Swiss Pat. No. 632 064. It is used for the assembly of frameworks consisting of vertical supports and horizontal beams. A clamping device is located at each end of a horizontal beam, the head of the retaining pin being introduced into a longitudinal groove in one of the horizontal beams. By means of the eccentric screw, the retaining pin is drawn inwards against the force of the spring in order to fix the beam onto the support.

The assembly of the clamping device is inconvenient because the retaining pin must be pressed into the bore of the insertion core and held until the eccentric screw is inserted. During the assembly of the framework, faulty handling can occur if the eccentric screw is rotated in the wrong direction so that its point releases the conical recess in the retaining pin and the latter is expelled from the insertion core by the spring.

SUMMARY OF THE INVENTION

The objective of the invention is to produce a clamping device, of the type mentioned at the beginning, in which these disadvantages are avoided. Such a clamping device has, in accordance with the invention, the features defined in the characterisation of Patent claim 1.

The retaining pin with snap-in connection to the insertion core can still be displaced axially to a limited extent. While the eccentric screw is being screwed out, the retaining pin is prevented from springing out by the snap retention. The snap retention also permits simple and convenient assembly because it is only necessary to press the retaining pin into the insertion core until its rear end engages. The eccentric screw is then inserted afterwards.

DESCRIPTION OF THE PREFERRED EMBODIMENT

Figure 1:
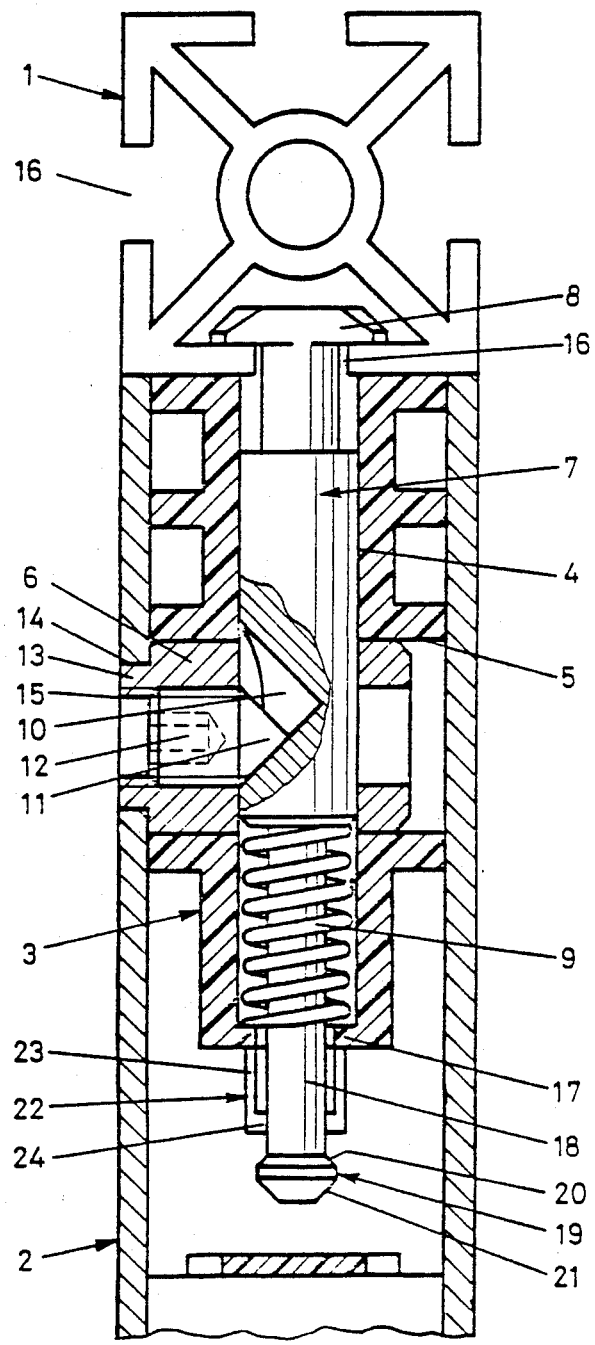
FIGS. 1 and 2 show embodiments of the invention described in more detail below using the drawing, which in each Figure shows sections through a connection point of a framework.
Figure 2:
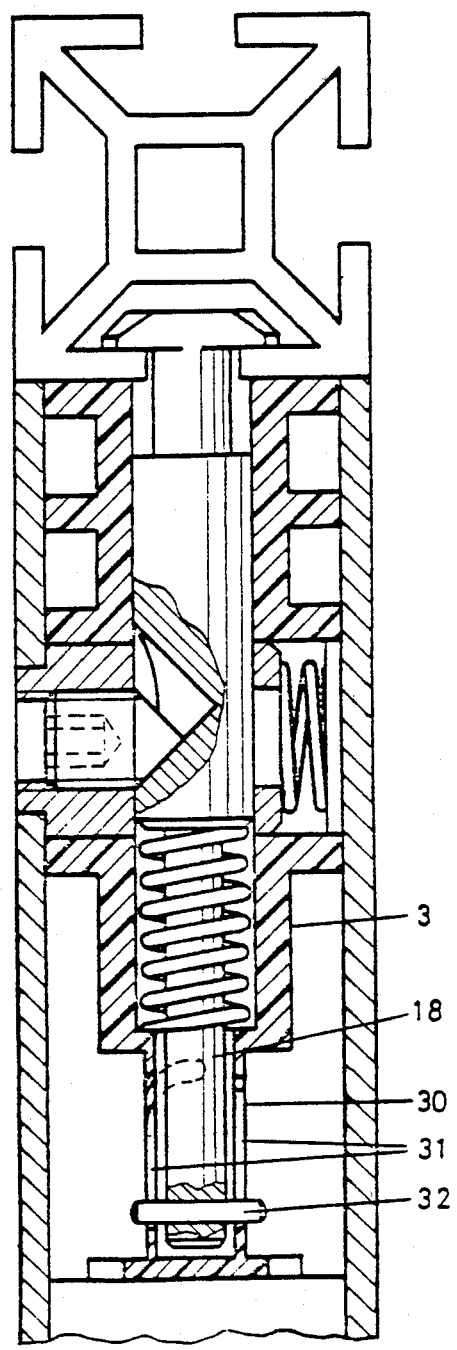

The framework shown in the figure has a vertical support 1 and a transverse beam 2 releasably connected to it. A plastic insertion core 3 having a longitudinal bore 4, which does not pass right through, and a transverse bore 5 is inserted in the end of the transverse beam 2 and held by means of a threaded bush 6 seated in the transverse bore 5. A retaining pin 7, supported so that it can be longitudinally displaced in the longitudinal bore 4 of the insertion core 3 and having a T-shaped retaining head 8, is pressed against a spring 9 which is in turn accommodated in the longitudinal bore 4 and is supported on an inner circular rib 17 of the bore wall.

A conical recess 10, which is penetrated eccentrically by the conical end 11 of a screw 12 guided in the threaded bush 6, is provided in the pin 7. An edge part 13 of the threaded bush 6 plugs into a corresponding opening 14 of the transverse beam 2 and so holds the insertion core 3 in its correct position. The bush 6 also has a bore 15 through which the pin 7 is led.

The support 1 is provided with four undercut longitudinal grooves 16, into which the retaining head 8 can be inserted, the retaining head 8 then engaging behind the grooves 16.

The retaining pin 7 has a rear extension in the form of a rod 18 whose end carries a widened partial piece 19. This partial piece 19 is provided on both sides with peripheral oblique surfaces 20, 21, the oblique surfaces forming an angle of 45° with the longitudinal axis of the retaining pin. The insertion core 3 is also lengthened rearwards in the form of a rear port 22 with flexible wall parts 23, whose ends have inward protruding followers 24, forming part of snap retention means.

When assembling the clamping device, the insertion core 3 is first pressed into the horizontal beam 2 and fixed by means of the threaded bush 6. The springs 9 and the retaining pin 7 are now pushed into the longitudinal bore 4 of the insert core. In this process, the oblique surfaces 21 of the widened end piece 19 push the flexible wall parts 23 apart until the followers 24 take up spring engagement behind the partial piece 19. The retaining pin 7 is now held in the insertion core 3, and the eccentric screw 12 can be screwed into the threaded bush 6.

In order to remove the retaining pin from the insertion core, the eccentric screw is first removed and the retaining pin then drawn outwards, for example by means of a tool which is placed on the retaining head of the pin. The inner oblique surface 20 pushes the followers 24 apart so that the retaining pin is released.

In another embodiment, provision is additionally made for the retaining pin 7 and the T-shaped head 8 to execute a rotation by 90° during the axial displacement. For this purpose, the snap retention 22 must be designed as a sleeve 30, in the wall of which at least one guide groove 31 extending helically over a quarter circle is present. Instead of the head 19, a diagonally arranged peg 32 must then be inserted in the rod 18.

The guide groove 31 can be provided on one side or diagonally on two sides, and correspondingly the peg 32 is then continuous or is inserted in the rod 18. In principle, the shape of the guide groove 31 can be selected as desired, but to ensure good interaction with the screw 12 and the conical recess 10, the rear portion of the guide groove 31 should run on an axial straight line and only the last front portion should follow the helical quarter circle.

I claim:

1. In a clamping device for the separable connection of two profile section parts, an insertion core having a transverse bore and a rear part, said insertion core being located in one of the profile section parts, said other profile secton part having a longitudinal groove, an axially movable, spring-loaded retaining pin having a front end and a rear end and being supported within said insertion core for axial movement therein, said retaining pin including a T-shaped head at said front end engaged in said longitudinal groove in the other profile section part, a threaded bush mounted in said insertion core transverse bore, a lateral conical recess within said retaining pin, and a conically pointed screw, guided in said threaded bush, being in eccentrically displaced engagement in said lateral conical recess of the retaining pin in order to displace the latter axially, the improvement comprising retention means forming a disconnectable engagement of said rear end of said retaining pin (7) and said rear part of said insertion core (3), and wherein said retention means comprises the rear end of the retaining pin having a rod (18) with a widened end part (21), and wherein the rear part of the insertion core being provided with spreading fingers 23 extending longitudinally along opposing sides of said retaining pin and terminating in inward protruding followers (24) engaged with the rod behind the widened end part thereof.

2. Clamping device in accordance with claim 1, wherein the widened end part (19) has two peripheral oblique surfaces (20, 21) facing oppositely, which alternately cam said followers (24) apart during the introduction and removal of the retaining pin rod (18).

3. Clamping device for separable connection of two profile section parts, an insertion core having a transverse bore and a rear part, said insertion core being located in one of the profile section parts, said other profile section part having a longitudinal groove, an axially movable, spring-loaded retaining pin having a front end and a rear end and being supported within said insertion core for axial movement therein, said retaining pin including a T-shaped head at said front end engaged in said longitudinal groove in the other profile section part, a threaded bush mounted in said insertion core transverse bore, a lateral conical recess within said retaining pin, and a conically pointed screw, guided in said threaded bush, being in eccentrically displaced engagement in said lateral conical recess of the retaining pin in order to displace the latter axially, the improvement comprising retention means forming a disconnectable engagement of said rear end of said retaining pin (7) and said rear part of said insertion core (3), wherein said retaining pin terminates in a rod as an extension thereof, wherein the rear part of said insertion core comprises a sleeve formed with diagonally located longitudinal slits for axially guiding the rod (18), and the rod (18) includes a transverse peg projecting radially outwardly thereof and having ends engaging said longitudinal slits and thereby defining said retention means.

4. Clamping device according to claim 3, wherein the longitudinal slits run helically in a quarter circle in order to cause the peg to rotate the T-shaped head of said retaining pin by 90° during its axial displacement.

* * * * *